US005768377A

United States Patent [19]

Chang

[11] Patent Number: 5,768,377

[45] Date of Patent: Jun. 16, 1998

[54] VIDEO SIGNAL DESCRAMBLING APPARATUS

[75] Inventor: Dong Hyun Chang, Suwon, Rep. of Korea

[73] Assignee: Samsung Electro-Mechanics Co., Ltd., Suwon, Rep. of Korea

[21] Appl. No.: 692,674

[22] Filed: Aug. 6, 1996

[30] Foreign Application Priority Data

Oct. 25, 1995 [KR] Rep. of Korea ..................... 95-36993

[51] Int. Cl.[6] ..................................................... H04N 7/167

[52] U.S. Cl. ................................ 380/15; 380/10; 380/17; 380/20

[58] Field of Search ................................ 380/10, 11, 12, 380/13, 14, 15, 16, 17, 19, 20, 18

[56] References Cited

U.S. PATENT DOCUMENTS 4,323,922 4/1982 Den Toonder et al. ............. 380/15 X
4,424,532 1/1984 Den Toonder et al. ............. 380/15 X
4,575,755 3/1986 Schoeneberger et al. ............... 380/15
4,815,129 3/1989 Griffin et al. ............................ 380/15
5,319,709 6/1994 Raiser et al. ............................. 380/15

*Primary Examiner*—Bernarr E. Gregory
*Attorney, Agent, or Firm*—Ladas & Parry

[57] ABSTRACT

A video signal descrambling apparatus capable of restoring a scrambled video signal transmitted from a cable television or commercial broadcasting system to the original standard video signal to permit subscribers to enjoy the scrambled signal and to provide a selective video service to the subscribers. According to the apparatus, a sync signal and information data are separated from the scrambled video signal, and control signals are generated based on the separated sync signal and the data. The artificial sync signal inserted in the scrambled video signal is removed in accordance with the control signal, and the attenuated sync signal in the scrambled video signal is restored to the original sync signal, so that the descrambling of the scrambled video signal is completed.

3 Claims, 3 Drawing Sheets

VIDEO INPUT
FIRST AMP
21
22
FIRST MUX
23
S/H
21a
+AMP
-AMP
24a
SECOND MUX
25
21b
+AMP
+AMP
24b
THIRD MUX
26
21c
SECOND AMP
VIDEO OUTPUT
"OV"
SYNC SEPARATOR
27
LOGIC CIRCUIT
29
MICRO-COMPUTER
30
DISPLAY
31
DATA SEPARATOR
28

VIDEO SIGNAL DESCRAMBLING APPARATUS

BACKGROUND OF THE INVENTION

1. Field of the Invention

The present invention relates to a video signal descrambling apparatus, and more particularly to a video signal descrambling apparatus which can restore a scrambled video signal transmitted from a cable television or commercial broadcasting system to the original standard video signal to permit subscribers to enjoy the scrambled signal and to provide a selective video service to the subscribers.

2. Description of the Prior Art

A conventional video signal descrambling apparatus as shown in FIG. 1 comprises a tuner 11 for tuning and selecting a radio frequency (RF) signal transmitted from a broadcasting station and converting the selected RF signal to an intermediate frequency (IF) signal, a logic circuit section 15 for producing a tuning pulse signal which coincides with an attenuated sync signal inserted in the scrambled video signal under the control of a microcomputer 14, an IF switching section 12 for switching the IF signal outputted from the tuner 11 in accordance with the tuning pulse signal provided from the logic circuit section 15 to restore the suppressed sync signal of the scrambled video signal, and a video/audio IF detecting section 13 for detecting a video IF signal and an audio IF signal from the output signal of the IF switching section 12 under the control of the microcomputer 14 to provide a video signal and an audio signal.

According to the conventional video signal descrambling apparatus as constructed above, the tuner 11 tunes and selects a RF signal transmitted from the broadcasting station and converts the selected RF signal to an IF signal to provide the converted IF signal to the IF switching section 12.

The IF switching section 12 performs a switching operation with respect to the IF signal provided from the tuner 11 in accordance with the switching pulse signal provided from the logic circuit section 15, which coincides with the attenuated sync signal in the IF signal to restore the suppressed sync signal to the original sync signal.

The video/audio IF detecting section 13 detects the video IF signal and the audio IF signal from the IF signal outputted from the IF switching section 12 in accordance with a control signal provided from the microcomputer 14, and outputs the detected video signal and the audio signal to a following video/audio processing circuit.

As a result, the scrambled video signal is restored to the original video signal by the above-described descrambling operation, and thus the restored video signal can be viewed on a display screen.

However, the conventional video signal descrambling apparatus has drawbacks in that though it can descramble a video signal which is scrambled by a sync signal suppression method, it cannot descramble a video signal which is scrambled by other methods, and especially by an artificial sync signal insertion method which is now mostly used in the art.

Specifically, in the event that the video signal is scrambled by the sync signal suppression method, the scrambled video signal may be easily descrambled by any simple-structured descrambler as in the prior art. However, in the event that the video signal is scrambled by the artificial sync signal insertion method and by the sync signal suppression method as well, the descrambling of the scrambled video signal will be impossible by the prior art descrambling method or descrambler.

SUMMARY OF THE INVENTION

The present invention has been made to solve the problems involved in the prior art. Therefore, it is an object of the present invention to provide a video signal descrambling apparatus capable of restoring a scrambled video signal transmitted from a cable television or commercial broadcasting system to the original standard video signal to permit subscribers to enjoy the scrambled signal and to provide a selective video service to the subscribers.

In order to achieve the above object, the present invention provides a video signal descrambling apparatus comprising:

- a first amplifier for non-inversion-amplifying a scrambled video signal transmitted from a cable broadcasting system;
- a sync separator for separating a horizontal/vertical sync signal from said scrambled video signal outputted from said first amplifier;
- a data separator for extracting information data from said scrambled video signal outputted from said first amplifier;
- logic circuit means for producing control signals in accordance with said sync signal provided from said sync separator and said data provided from said data separator;
- a microcomputer for controlling said logic circuit means in accordance with said data provided thereto through said logic circuit means, said microcomputer providing a display control signal for displaying a present operating state of said apparatus on a display;
- a first multiplexer for removing an artificial sync signal which is inserted in said scrambled video signal outputted from said first amplifier in accordance with said control signal provided from said logic circuit means;
- sample-hold means for sampling and holding said video signal outputted from said first multiplexer to maintain a DC offset of said video signal constant;
- a first non-inversion/inversion amplifier for non-inversion- and inversion-amplifying an output signal of said sample-hold means;
- a second multiplexer for selecting one of output signals of said first non-inversion/inversion amplifier in accordance with said control signal provided from said logic circuit means to restore said sync signal;
- a second non-inversion/inversion amplifier for non-inversion- and inversion-amplifying an output signal of said second multiplexer;
- a third multiplexer for restoring said attenuated sync signal in said video signal outputted from said second non-inversion/inversion amplifier to the original sync signal; and
- a second amplifier for non-inversion-amplifying said video signal, in which said sync signal is restored, outputted from said third multiplexer to provide a descrambled video signal.

BRIEF DESCRIPTION OF THE DRAWINGS

The above object, other features and advantages of the present invention will become more apparent by describing the preferred embodiment thereof with reference to the accompanying drawings, in which.

DETAILED DESCRIPTION OF THE PREFERRED EMBODIMENT

Figure 1:
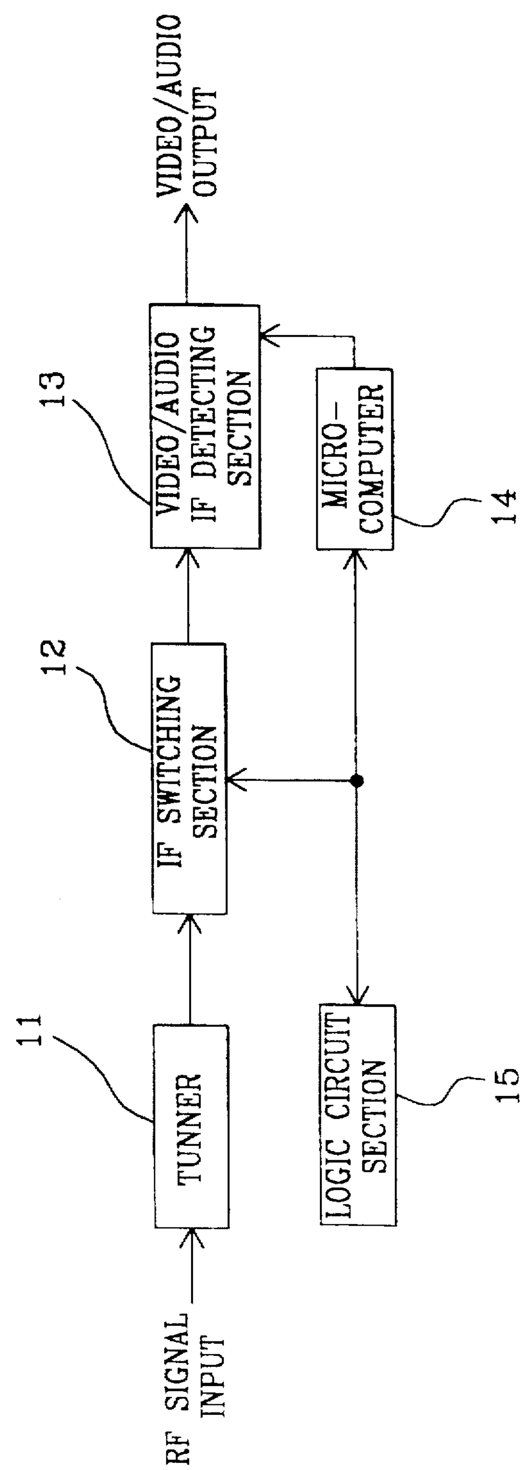
FIG. 1 is a block diagram of a conventional video signal descrambling apparatus.
Figure 2:
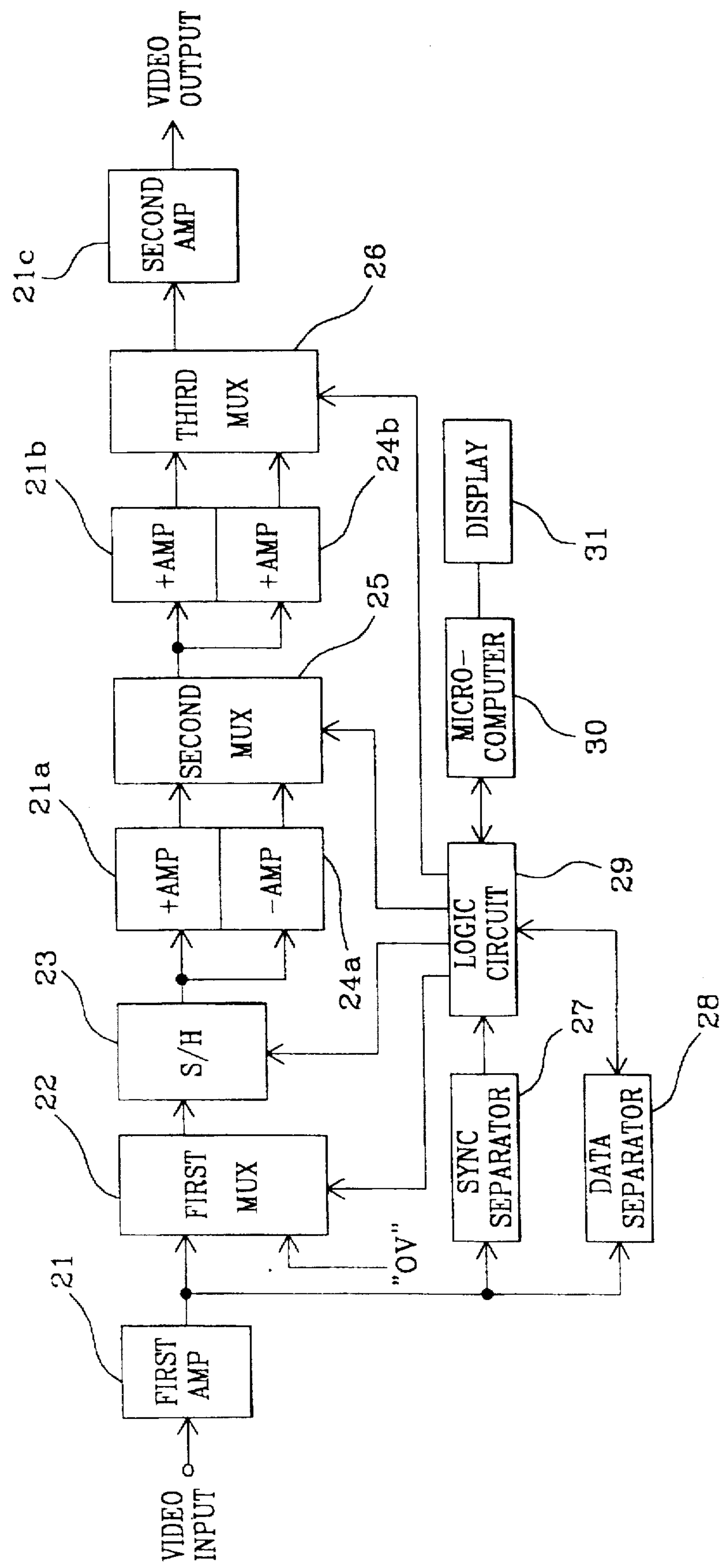
FIG. 2 is a block diagram of the video signal descrambling apparatus according to the present invention.

FIG. 2 shows the construction of the video signal descrambling apparatus according to the present invention. Referring to FIG. 2, the video signal descrambling apparatus according to the present invention is provided with a first amplifier 21 for non-inversion-amplifying a scrambled video signal transmitted from a cable broadcasting system, a sync separator 27 for separating a horizontal/vertical sync signal from the scrambled video signal outputted from the first amplifier 21, a data separator 28 for extracting information data from the scrambled video signal outputted from the first amplifier 21, a logic circuit section 29 for producing control signals in accordance with the sync signal provided from the sync separator 27 and the data provided from the data separator 28, a microcomputer 30 for controlling the logic circuit section 29 in accordance with the data provided thereto through the logic circuit section 29, the microcomputer 30 providing a display control signal for displaying a present operating state of the descrambling apparatus on a display section 31, a first multiplexer 22 for removing an artificial sync signal which is inserted in the scrambled video signal outputted from the first amplifier 21 in accordance with the control signal provided from the logic circuit section 29, a sample-hold section 23 for sampling and holding the video signal outputted from the first multiplexer 22 to maintain a DC offset of the video signal constant, a first non-inversion/inversion amplifier 21*a* and 24*a* for non-inversion- and inversion-amplifying an output signal of the sample-hold section 23, a second multiplexer 25 for selecting one of output signals of the first non-inversion/inversion amplifier 21*a* and 24*a* in accordance with the control signal provided from the logic circuit section 29 to restore the sync signal, a second non-inversion/inversion amplifier 21*b* and 24*b* for non-inversion- and inversion-amplifying an output signal of the second multiplexer 25, a third multiplexer 26 for restoring the attenuated sync signal in the video signal outputted from the second non-inversion/inversion amplifier 21*b* and 24*b* to the original sync signal, and a second amplifier 21*c* for non-inversion-amplifying the video signal, in which the sync signal is restored, outputted from the third multiplexer 26 to provide a descrambled video signal.

The operation of the video signal descrambling apparatus according to the present invention as constructed above will now be explained with reference to FIGS. 2, 3A to 3E.

Figures 3A, 3B, 3C, 3D, 3E:
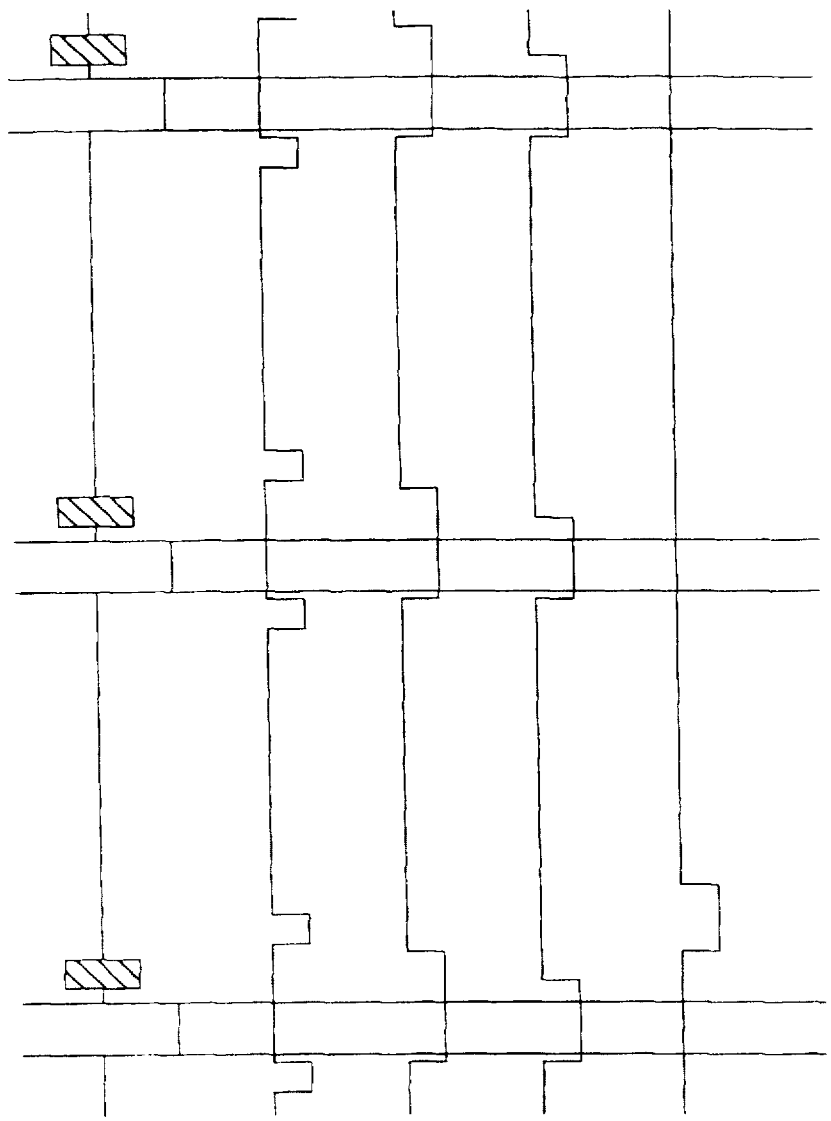
FIGS. 3A to 3E are timing diagrams explaining the operation of the apparatus of FIG. 2.

First, a scrambled video signal as shown in FIG. 3A, which is transmitted from a cable broadcasting system, is non-inversion-amplified by the first amplifier 21, and the amplified video signal is inputted to the first multiplexer 22, the sync separator 27, and the data separator 28, respectively. The sync separator 27 separates the horizontal/vertical sync signal from the scrambled video signal inputted thereto, and provides the separated sync signal to the logic circuit section 29. The data separator 28 extracts information data from the scrambled video signal inputted thereto, and provides the extracted data to the logic circuit section 29.

The logic circuit section 29 produces the control signal for removing an artificial sync signal, the control signal for a sampling period and holding operation, and the control signal for restoring the sync signal to the original sync signal by the selection of the sync signal in accordance with the sync signal and the data inputted thereto as a reference signal. Also, the logic circuit section 29 transfers the data inputted thereto to the microcomputer 30.

Specifically, the logic circuit section 29 detects a command bit from the data outputted from the data separator 28, determines whether the received video signal is scrambled or not, and then transmits a tag value to the microcomputer 30. The logic circuit section 29 also detects the frame count value, automatically change the present mode to a scramble mode, and produces a timing pulse signal which coincides with the scramble mode. At this time, the logic circuit section 29 transmits the subscriber's address contained in the inband data to the microcomputer 30, and determines whether or not the inband data is in error by detecting the error correction byte.

On the other hand, the microcomputer 30 controls the logic circuit section 29 to produce the control timing pulse signal in accordance with the tag value and the subscriber's address of the inband data which are transmitted from the logic circuit section 29. The microcomputer 30 also provides the display control signal to the display 31 so that the present state of the received video signal is displayed on the display 31.

The first multiplexer 22 removes the artificial sync signal inserted in the scrambled video signal outputted from the first amplifier 21 in accordance with the control signal for removing the artificial sync signal provided from the logic circuit section 29. The first multiplexer 22 provides to the sample-hold section 23 the video signal from which the artificial sync signal is removed.

The sample-hold section 23 samples and holds the video signal outputted from the first multiplexer 22 in accordance with the control signal for a sampling period and holding operation as shown in FIG. 3E. Specifically, the sample-hold section 23 performs a sampling and holding operation for each field in response to the sample/hold pulse signal which was inserted into the video signal by a scrambler to maintain the DC offset of the video signal in a desired level. The offset-maintained video signal is then inputted to the first non-inversion/inversion amplifier 21*a* and 24*a*.

The first non-inversion amplifier 21*a* non-inversion-amplifies the offset-adjusted video signal to provide the amplified signal to the second multiplexer 25, and the first inversion amplifier 24*a* inversion-amplifies the offset-adjusted video signal to provide the inversion-amplified signal to the second multiplexer 25.

The second multiplexer 25 selects one of the video signal and the inverted video signal outputted from the first non-inversion/inversion amplifier 21*a* and 24*a* in accordance with the control signal for restoring the sync signal to the original sync signal provided from the logic circuit section 29. Accordingly, the inversed sync signal line is reversed and thus the attenuated sync signal is restored to the original sync signal.

The video signal in which the sync signal is restored is then amplified by the second non-inversion amplifier 21*b* and is provided to the third multiplexer 26, while it is inversion-amplified by the second inversion amplifier 24*b* with the amplification factor of 2, and is provided to the third multiplexer 26.

The third multiplexer 26 selects one of the video signals inputted thereto in accordance with the timing control signal for restoring the attenuated sync signal to the original sync signal provided from the logic circuit section 29 to restore the scrambled video signal to the original video signal.

As result, the descrambling of the scrambled video signal is completed by the above described operation, and the descrambled video signal is then non-inversion-amplified by the second amplifier 2*c* to be outputted as the standard video signal.

From the foregoing, it will be apparent that the present invention provides advantages in that it can restore a scrambled video signal in which an artificial sync signal is inserted to the original standard video signal to permit a subscriber provided with the descrambler according to the present invention to enjoy the scrambled signal as well as to provide a selective video service to the subscriber.

While the present invention has been described and illustrated herein with reference to the preferred embodiment thereof, it will be understood by those skilled in the art that various changes in form and details may be made therein without departing from the spirit and scope of the invention.

What is claimed is:

1. A video signal descrambling apparatus comprising:

a first amplifier for non-inversion-amplifying a scrambled video signal transmitted from a cable broadcasting system;

a sync separator for separating a sync signal from said scrambled video signal outputted from said first amplifier;

a data separator for extracting information data from said scrambled video signal outputted from said first amplifier;

logic circuit means for producing control signals in accordance with said sync signal provided from said sync separator and said data provided from said data separator;

a microcomputer for controlling said logic circuit means in accordance with said data provided thereto through said logic circuit means, said microcomputer providing a display control signal for displaying a present operating state of said apparatus on a display;

a first multiplexer for removing an artificial sync signal which is inserted in said scrambled video signal outputted from said first amplifier in accordance with said control signal provided from said logic circuit means;

sample-hold means for sampling and holding said video signal outputted from said first multiplexer to maintain a DC offset of said video signal constant;

a first non-inversion/inversion amplifier for non-inversion- and inversion-amplifying an output signal of said sample-hold means;

a second multiplexer for selecting one of output signals of said first non-inversion/inversion amplifier in accordance with said control signal provided from said logic circuit means to restore said sync signal;

a second non-inversion/inversion amplifier for non-inversion- and inversion-amplifying an output signal of said second multiplexer;

a third multiplexer for restoring said attenuated sync signal in said video signal outputted from said second non-inversion/inversion amplifier to the original sync signal; and a second amplifier for non-inversion-amplifying said video signal, in which said sync signal is restored, outputted from said third multiplexer to provide a descrambled video signal.

2. A video signal descrambling apparatus as claimed in claim 1, wherein said logic circuit means detects a command bit from said data-outputted from said data separator, determines whether said received video signal is scrambled or not, transmits a tag value to said microcomputer, detects a frame count value to automatically change a present mode to a scramble mode, produces a timing pulse signal which coincides with said scramble mode, transmits a subscriber's address contained in inband data to said microcomputer, and determines whether or not said inband data is in error by detecting an error correction byte.

3. A video signal descrambling apparatus as claimed in claim 1, wherein said second multiplexer selects one of said output signals of said first non-inversion/inversion amplifier in accordance with said selection control signal provided from said logic circuit means, whereby an inverted line of said sync signal is reversed, and said attenuated sync signal is restored to the original sync signal.

* * * * *